Jan. 5, 1971     K. L. SUBLETT     3,553,638
SONAR SCANNING MECHANISM Filed June 19, 1969     3 Sheets-Sheet 1

INVENTOR.
KENNETH L. SUBLETT
BY
ATTORNEYS

INVENTOR.
KENNETH L. SUBLETT

BY

ATTORNEYS

Jan. 5, 1971   K. L. SUBLETT   3,553,638

SONAR SCANNING MECHANISM

Filed June 19, 1969   3 Sheets-Sheet 3

INVENTOR.
KENNETH L. SUBLETT
BY *Seed, Berry & Dowrey*

ATTORNEYS

United States Patent Office 3,553,638
Patented Jan. 5, 1971

3,553,638
SONAR SCANNING MECHANISM
Kenneth L. Sublett, Seattle, Wash., assignor to Western Marine Electronics Company, Seattle, Wash., a corporation of Washington
Filed June 19, 1969, Ser. No. 841,188
Int. Cl. B63b 45/08; G01s 9/70
U.S. Cl. 340—3                                         14 Claims

ABSTRACT OF THE DISCLOSURE

A marine sonar system is disclosed employing a support mechanism for an acoustic transducer capable of stabilizing the transducer from the pitch and roll motion of a ship. The transducer is freely suspended from a frame. A drive mechanism for varying the angle of the transducer includes two ring gears meshed with pinion gears journaled in the frame. The ring gears are free to rotate about the pinion gears to align with the gravity vector. Additionally, rotation of the pinion gears rotates the transducer without disturbing its alignment with the gravity vector. The transducer can be aimed to varying water depths by rotation of the pinion gears. The pinion gears are driven by an intermediate gear mechanism meshed with vertical rack gears. The rack gears are split into halves so that one-half can remain in mesh with a drive motor while the entire frame on which the transducer is mounted is rotated to aim the transducer at various angles. The sonar system further includes means for raising and lowering the transducer relative to the hull of the ship between scanning and rest position.

BACKGROUND OF THE INVENTION

The present invention relates to marine sonar systems wherein an acoustic transducer, a device for generating and detecting sound waves, is used to search for objects in the water around a vessel. Specifically, the present invention relates to a drive mechanism for varying the orientation of a transducer to establish the direction of sonar scan while stabilizing the transducer against the pitch and roll of a marine vessel.

The fishing industry has long utilized sonar systems for searching for schools of fish in the open seas. To make the sonar equipment economically practical for commercial use, accuracy and range have been sacrificed in the interest of cost reduction. The errors introduced into a sonar system by the pitch and roll motion of a ship are generally ignored. Consequently, it is a common practice to rigidly mount the sonar transducer on the vessel and allow the motion of the ship to be directly transmitted to the transducer.

The sound waves generated by an acoustic transducer may be thought of as emanating outwardly forming a cone-shaped scanning beam similar in shape to the cone of light emanating from a flashlight. The scanning beam in a rigidly mounted transducer aimed parallel to the horizon and in line with the keel of the ship on which it is mounted, is reflected off the interfaces between the water, air and ocean floor as a result of the pitch motions of the ship. The transducer, detecting sound waves reflected off these interfaces, makes it extremely difficult to detect reflections from other desired objects such as fish. In addition, the constant motion of the ship prevents the range of objects from being accurately calculated. The roll motions of the ship, it should be noted, do not adversely affect the scanning beam of a transducer emanating parallel to the keel of the ship because they merely rotate the beam and do not change its direction relative to the ship. The scanning beam is affected by roll motion when the beam is aimed at right angles to the keel.

The transducer can be isolated from the motions of a ship by use of motion sensing devices such as gyroscopes but the cost of doing so is generally prohibitive for commercial application. If the problem is ignored, the scanning beam must be aimed downward to minimize the possibility of its being reflected off the air-water interface. This reduces the range of the sonar system and does not eliminate the error introduced by the ship's motion.

The present invention overcomes the foregoing limitations of prior sonar systems by pendulously suspending an acoustic transducer in a manner that enables it to rotate a full 360° relative to the ship without disturbing its alignment with the gravity vector. The transducer is mounted to a support means by a mounting means journaled to the support means such that the support means and transducer are independently pivotable about a transverse axis. The transducer is pivotally suspended from a frame by support members. A ring gear is rigidly coupled to the transducer and is looped over a pinion gear journaled in the frame at the pivot point. The transducer hangs freely from its pivot point in a pendulous fashion regardless of which portion of the ring gear is engaged with the pinion gear. The pinion gear and, therefore the transducer, are rotated by a rack gear slidably mounted in the frame. The rack gear is split into top and bottom halves which are rotatable relative to one another so as to allow the top half to remain engaged with a stationary drive motor as the entire frame and transducer are rotated.

The transducer and associated mechanisms are mounted in a housing. The housing is in turn slidably mounted within an elevator well so that the transducer can be lowered into the water to a scanning position and raised to a protective position within the elevator well when the scanning operation is completed. Fins are attached to the housing for bracing it against lateral movement within the elevator shaft and for permitting the free flow of water past it when it is raised and lowered.

It is a primary object of the present invention to improve the range and accuracy of sonar systems.

It is also an object to stabilize the acoustic transducer of a sonar system against the pitch and roll motion of a ship.

It is a further object to provide a drive mechanism for a pendulously suspended transducer that is capable of varying the orientation of the transducer in a three dimensional reference frame without disturbing the alignment of the transducer with the gravity vector.

Another object of the invention is an improved mechanism for raising and lowering the transducer to and from a scanning position.

Yet another object is to provide a compact and economic support and scan drive mechanism for the transducer of a sonar system.

DESCRIPTION OF THE INVENTION

Figure 1:
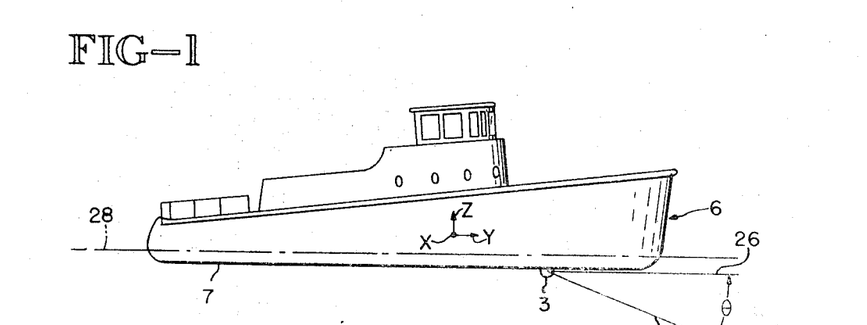
FIG. 1 is a side elevation view of a ship showing the relative location of the transducer within the ship.
Figure 6:
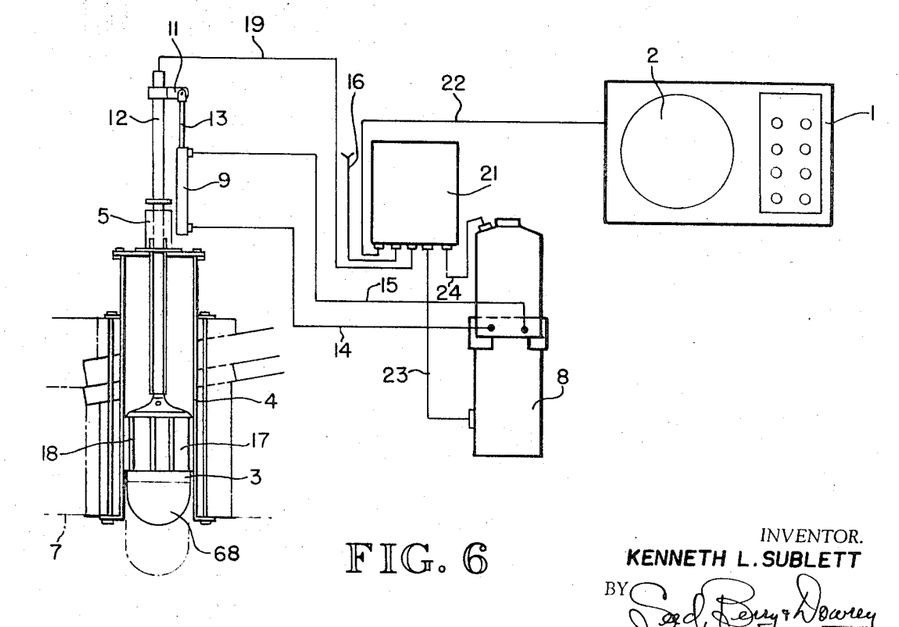
FIG. 6 is a schematic of a sonar system including the housing for the apparatus of FIG. 2 and the means for raising and lowering the housing.

FIG. 6 illsustrates the various components of the present sonar system. The electronic portion of the system is primarily contained in the electronic control console 1 which also houses the cathode ray tube 2 on which the objects detected by the system are displayed. The acoustic transducer is located inside housing 3 which is shown in FIG. 6 at its rest or protective position within an elevator well 4. A typical location for the sonar system in a marine vessel is shown in FIG. 1. The control console 1 is normally located in the pilot house of the vessel where the operator can control the raising and lowering of the housing and the scanning motions of the transducer.

The housing is raised and lowered between the rest position shown in FIG. 6 and the scanning position (shown in phantom in FIG. 6) below the keel 7 of a ship by a lift mechanism that includes hydraulic unit 8, double acting hydraulic cylinder 9, linking member 11 and tie rod 12. Piston rod 13 of the cylinder is coupled to tie rod 12 by linking member 11. Tie rod 12 extends into the elevator well through appropriate seals 5 where it connects to housing 3. Retracting the piston rod into the cylinder pulls the tie rod downward moving the housing to the scanning position. Hydraulic unit 8 is in fluid communication with the cylinder by virtue of the fluid conduits 14 and 15 attached to ports on opposite sides of the piston in the cylinder. The hydraulic unit 8 includes appropriate pumps, motors and directional flow control valves for extending and retracting piston rod 13.

A guide member 17 is connected to housing 3 and has fins 18 which abut the inner walls of the elevator well to prevent lateral motion of the housing within the well. The fins stabilize the housing in extended position as well as when retracted. The fins also allow free flow of water to either side of the housing thereby minimizing an increase in water pressure on either side of the housing as it moves within the elevator well 4.

An electrical cable bundle 19 extends through the center of tie rod 12 and is electrically coupled to the acoustic transducer, the electric motors that drive the transducer and to other electrical circuitry required by the system. The other end of cable 19 is terminated at junction box 21 which is in turn connected to control console 1 by electrical cable bundle 22. Electrical lines 23 and 24 connect hydraulic unit 8 to control console 1 through the junction box 21 and carry the electrical command signals issued by the control console to hydraulic unit 8 for raising and lowering the housing. Power for the system is supplied through line 16.

The orthogonal reference frame superimposed on ship 6 in FIG. 1 defines the pitch, roll and heading axes of a ship. The X vector (normal to and directed outwardly from the plane of the drawing) defines the pitch axis, the Y vector the roll axis and the Z vector the heading or bearing axis. Horizontal line 26 represents the direction of a scanning beam parallel to the Y or roll axis of the ship. Sonar scanning is accomplished by rotating the line 26 about the X vector for scanning horizontal to the horizon and by rotating line 26 about an axis parallel to the Z vector for scanning vertical to the horizon. Line 27 illustrates a direction for the scanning beam in the Y-Z plane as rotated about the X or pitch axis of the ship an angle designated $\theta$. In sonar systems utilizing rigidly mounted transducers, the scanning beam must be aimed downward a substantial angle $\theta$ to prevent the beam from reflecting off the air-water interface 28 as the vessel pitches and rolls. In the present sonar system the transducer is pendulously suspended so that it remains in substantial alignment with the gravity or Z vector regardless of the ship's motion. The scanning beam may be directed substantially parallel to the X-Y plane of the ship even though the ship is pitching and rolling without interference from reflection off the air-water interface. Thus the range and accuracy of the sonar system is increased.

Figure 2:
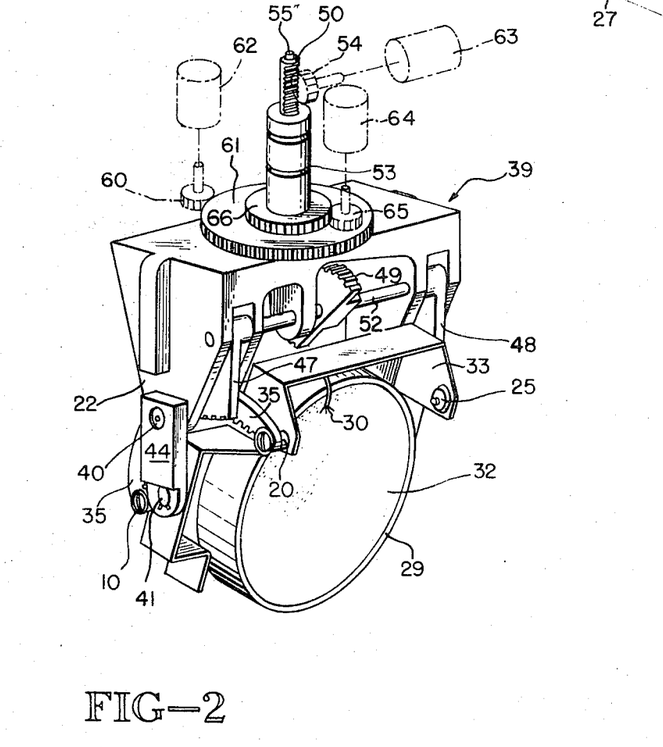
FIG. 2 is a front, perspective view of a transducer and associated support and drive mechanism.
Figure 3:
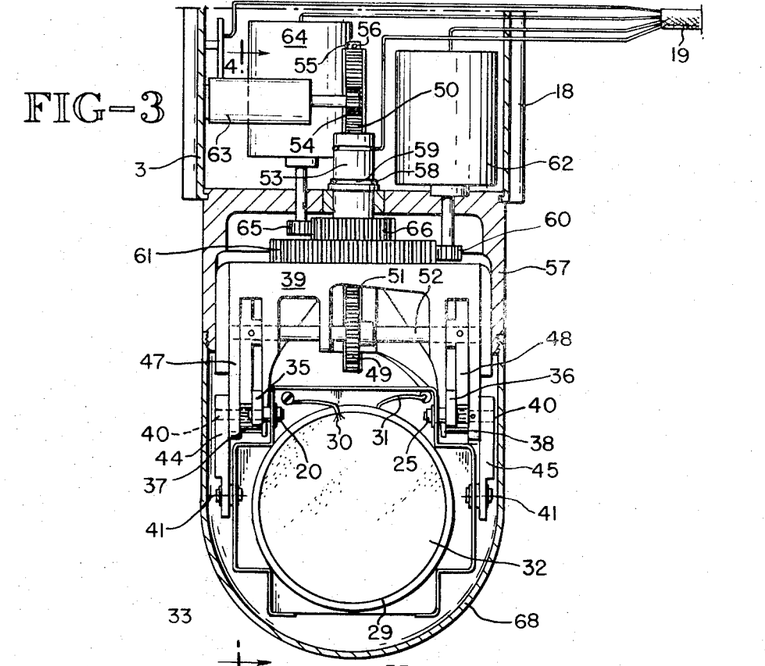
FIG. 3 is a front, elevation view of the apparatus of FIG. 2.
Figure 4:
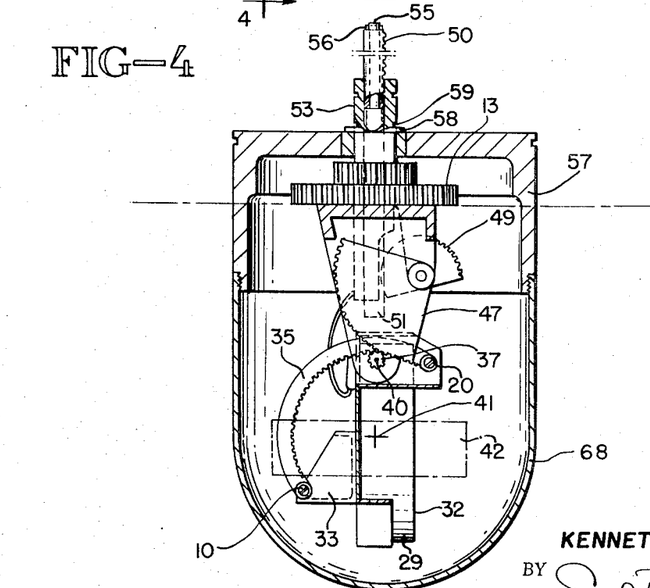
FIG. 4 is a side elevation view of the apparatus of FIG. 2 with a portion of the support means removed.

The mounting for the transducer is shown in FIGS. 2, 3, 4 and 5. Referring now to FIG. 2, the transducer 29 is a piezoelectric device which mechanically vibrates upon application of an electrical signal across it by the electrical conductors 30 and 21. The scanning beam may, for the purposes of this disclosure, be thought of as emanating outwardly normal to the face 32 of the transducer. The transducer is mounted on carriage 33 to which the ring gears 35 and 36 are rigidly attached at points 19, 20, 25 and 34 by appropriate fasteners. As best seen in FIG. 4, the ring gears are looped over and meshed with pinion gears 37 and 38. The pinion gears are journaled in frame 39 for rotation about their axes 40. The transducer carriage 33, and hence transducer 29, is pendulously suspended from the frame 39 by support members 44 and 45 at point 40 on frame 39 coaxial with the axes of pinion gears 37 and 38. Carriage 33 holding the transducer is connected to the opposite end of support members 44 and 45 at point 41. Mounting points 40 and 41 are journal mountings of low friction and enable the scanning beam direction to be varied by rotating the pinion gears without disturbing the pendulous suspension of the transducer.

Referring to FIG. 4, ring gears 35 and 36 of the present embodiment extend only through a segment of a full circle forming an arc of approximately 170 degrees. A 360 degree ring gear may be used but it is only necessary that the ring gear extend through an arc sufficient to obtain a desired sweep angle for the scanning beam. The desired sweep angle for the present embodiment is approximately 90 degree so that the scanning beam can be aimed parallel to the X-Y plane at one extreme and parallel to the Z axis at the other extreme. The transducer 29 is shown in FIG. 4 in a position that directs the scanning beam parallel to the X-Y plane. Phantom lines 42 indicate the position of the transducer for directing the scanning beam parallel to the Z axis. This position, indicated by the phantom lines, is obtained by rotating ring gears 35 and 36 through an angle of 90 degrees. The transducer is freely suspended from frame 39 at these two extreme positions and at all other angular positions between. Ring gears 35 and 36 are preferably attached to transducer 29 in a manner to direct the scanning beam at an angle of 45 degrees in the Y-Z plane when the pinion gears are midway along the ring gears.

Transducer 29 is positioned so that its axis coincides with the axis 41 of the ring gears. Balance weights are added to the carriage 33 to insure that the center of gravity of the transducer, carriage and attaching apparatus coincides with axis 41.

Support arms 44 and 45, best seen in FIGS. 2 and 4, provide means for loading the pinion and ring gears to keep them meshed at all times and means for supporting transducer 29. The arms 44 and 45 are pivotally coupled at one end at points which coincide with the axis of rotation 40 of the pinion gears and at the other end at points which coincide with the axes 41 of the ring gears. The support arms also limit the movement between the pinion and ring gears to rotational movement of the pinion gears about their axes 40 and to rotational movement of the ring gears about their axes 41.

Figure 5:
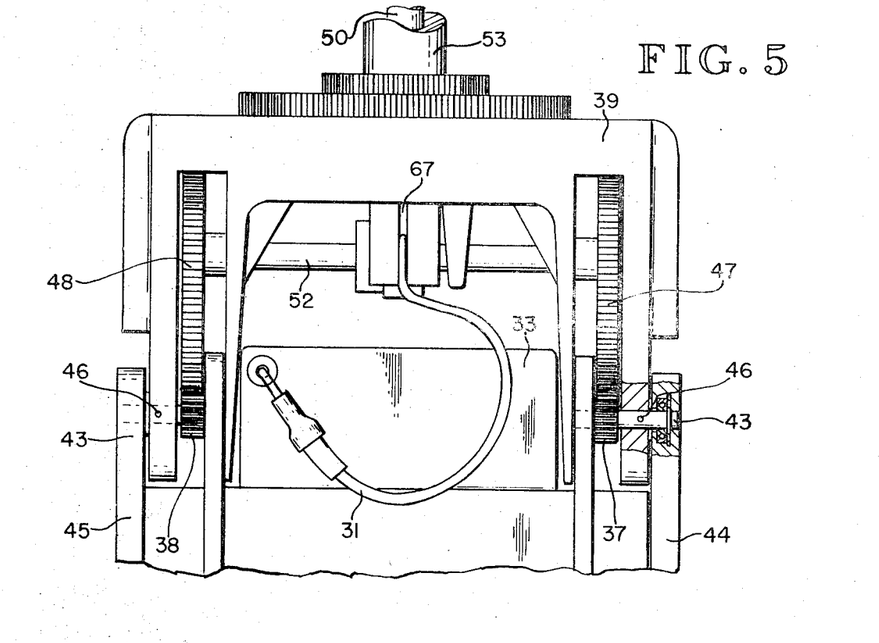
FIG. 5 is a rear, elevation view of the aparatus of FIG. 2 enlarged in size and having the lower portion deleted.

FIG. 5 best illustrates the mounting of the pinion gears and support arms. The mountings are the same on both the left and right sides of the frame. Shafts 43 are locked to frame 39 against rotation by pin 46. The support arms are pivotally attached to these stationary shafts 43 by suitable bearings and race. The pinion gears 37 and 38 are fitted over shafts 43 and are free to rotate thereon. The support arms 44 and 45 are also pivotally coupled to carriage 33 on shafts rigidly attached to the carriage. The axes of the shafts are coincident with the axes 41 of the ring gears.

The pinion and ring gears form a transducer drive mechanism for varying the orientation of transducer 29 relative to frame 39 without disturbing the alignment of the transducer with the gravity vector. The transducer drive mechanism is powered by an intermediate drive mechanism consisting of sector gears 47 and 48, transfer gear 49 and top and bottom rack gears 50 and 51 respectively. Gears 47, 48 and 49 are locked to shaft 52 which is journaled for rotation in frame 39. The top and bottom rack gears are slidably mounted within the stem member 53 for up and down movement along a vertical path. Bottom rack gear 51 is mounted to rotate relative to top rack gear 59 so as to permit top rack gear 50 to remain meshed with the stationary tilt drive gear 54 (FIG. 2), and the bottom rack gear to remain meshed with the transfer gear 49 as frame 39 is rotated about its vertical or Z axis. The bottom rack gear is rigidly connected to rack pin 55 (FIG. 4) and the top rack gear 50 is slidably fitted over pin 55 and secured thereto by a locking pin 56. This arrangement permits both rack gears to be driven up and down by rotation of tilt gear 54 while frame 39 and bottom rack gear 51 are simultaneously being rotated. Tilt gear 54 is secured to the shaft of scan drive motor 63.

Sector gears 47 and 48 are meshed with the pinion gears 37 and 38 respectively. Thus, up and down movements of the rack gears cause rotation of the pinion gears. The pinion gears in turn rotate the ring gears and the transducer. The gear ratio between the sector gears, pinion gears and ring gears is such that there is a one to one ratio between them.

Frame 39 is rotatably mounted to the platform 57 (FIG. 3) which is in turn rigidly attached to the walls of housing 3. Stem 53 extends through an opening in the platform and is secured thereto by the snap ring 58 fitted into the groove 59 on the stem. Scan drive gear 60 is meshed with the large diameter gear 61 rigidly attached to frame 39 for rotating the frame and transducer about the Z axis. Both motors 62 and 63 are mounted on the platform 57.

A resolver 64 is also mounted to platform 57. Gear 65, attached to the shaft of resolver 64 is in mesh with small diameter gear 66 rigidly attached to frame 39. Resolver 64 is a conventional device for generating electrical signals representing the heading of the frame 39, transducer 29 and, therefore, the scanning beam for displaying an object at its proper coordinates on the screen of cathode ray tube 2 of the control console.

An electrical circuit board component is mounted on the platform and/or housing along with other electrical components. These constitute a portion of the servo-mechanisms controlling the operation of the synchronous motors 62 and 63 and a portion of the transmitter and receiver circuits required to generate the scanning beam and detect the reflections. The transducer 29 is electrically coupled to these circuits through slip ring 67. Electrical conductor 31, best seen in FIG. 5, attached to the transducer, extends to stem 53, lays in groove 68 in the stem and terminates at slip ring 67. Appropriate insulation is provided between the stem, slip ring and conductor 31. All the electrical wires from the slip ring and other electrical apparatus are combined to form the electrical cable bundle 19 (FIG. 6) extending from the housing 3, through tie rod 12 of the junction box 21.

A soundome of plastic or other suitable material 68 forms part of the housing and covers the frame 39 and transducer 29. The soundome is filled with a high dielectric constant liquid providing a medium for conducting sound waves between the transducer and the wall of the soundome. Absent such a medium in the soundome, the sound waves would reflect off the soundome rather than pass through it and adversely affect the sensitivity of the transducer. The liquid medium also serves to damp oscillations of the pendulously suspended transducer. In this regard, the period of oscillation of the transducer is many times smaller than the period of oscillation of the ship about its pitch or roll axes. Consequently, the pitch and roll motions of the ship are not likely to cause the transducer to oscillate.

In operation, the operator manipulates the appropriate controls on the control console 1 to lower housing 3 to the sonar scanning position below the keel of the ship. The transducer is tilted to some predetermined angle $\theta$ in the Y–Z plane by the action of the scan drive motor 63. Motor 63 lowers the rack members 50 and 51 by virtue of gear 54. The bottom rack gear 51 rotates transfer gear 49 which turns shaft 52 and sector gears 47 and 48. The sector gears rotate the pinion gears and ring gears 35 and 36 in a one-to-one relationship, thereby rotating the transducer about its horizontal axis to a desired angle $\theta$. The transducer and frame 39 are, at the same time, rotated about their vertical or Z axes by the action of motor 62, gear 60 and gear 61. The transducer remains at the angle $\theta$ regardless of the pitch and roll motion of the ship because the ring gears 35 and 36 are not restrained from rotating on the pinion gears to keep the transducer aligned with the gravity vector.

The foregoing description of the transducer's behavior is true when the scanning beam is aligned with either the X or Y axis. The transducer will tilt away from the gravity vector a small amount when the scanning beam is aimed at an angle between the X and Y axes because the transducer is free to move about only one axis namely the axis running through the axes 41 of the ring gears. When the scanning beam is aimed at an angle of 45 degrees from either the X or Y axes a portion of both the pitch and roll motion of the ship causes a deflection of the scanning beam in the Y–Z plane. However, the magnitude of the deflection is substantially less than if the transducer were rigidly attached to the ship because the pendulous mounting of the transducer is capable of partially compensating for the pitch and roll motion. In practice, the ship is maneuvered, after initial contact with an object or objects, to keep the sweep of the scanning beam at a relatively small angle from the pitch or roll axes of the ship to substantially eliminate this problem.

When the sonar scanning operation is completed, the operator actuates the appropriate control on the control console 1 to raise housing 3 to its protective or rest position within elevator well 4. The elevator well extends through the hull of the ship (FIG. 6) thereby providing access to the housing without requiring the ship to be dry-docked.

It is believed that the invention will have been clearly understood from the foregoing detailed description. Changes in the details of construction may be resorted to without departing from the spirit of the invention. Accordingly, no limitations should be implied and the annexed claims should be given the broadest interpretation to which the employed language fairly admits.

The embodiments of the invention in which an exclusive property or privilege is claimed are defined as follows:

1. A sonar system for installation in a marine vessel which comprises
   an acoustic transducer for generating a sonar scanning beam and for detecting sound waves reflected from objects; support means, mounting means journaled to said support means and mounting said transducer from said support means such that said support means and transducer are independently pivotable about a transverse axis; vertical scan drive means operably coupled to said transducer to rotate said transducer about a transverse axis for vertical scanning without affecting the independent pivotability of said transducer and support means; and horizontal scan drive means operably coupled to said transducer to rotate said transducer about a vertical axis perpendicular to said transverse axis for horizontal scanning without affecting the independent pivotability of said transducer and support means.

2. The system of claim 1 wherein said horizontal scan drive means includes
a pionion gear journaled for rotation in said support means;
a ring gear rigidly connected to said transducer and in mesh with said pinion gear for effecting variations in the angle of said transducer and sonar scanning beam in response to rotation of said pinion gear; and
pinion drive means to rotate said pinion gear 3. The system of claim 2 wherein said support means includes a frame, a support arm pivotally connected at one end to said frame on an axis coincident with the axis of rotation of said pinion gear and pivotally connected at the other end to said transducer on an axis coincident with the axis of rotation of said ring gear, the teeth of the ring and pinion gears meshed to allow rotation of the pinion gear relative to the ring gear.

4. The system of claim 3 further including
a housing enclosing the transducer and frame;
a platform rigidly attached to said housing, said frame being rotatably supported from said platform for rotation about said vertical axis to permit 360° scanning of said transducer.

5. The system of claim 2 wherein said pinion drive means includes scan power means providing a power source for rotation of said transducer about said transverse axis, first and second transfer gears rigidly attached to a shaft journaled for rotation in said support means, said first transfer gear being in mesh with said pinion gear, and gear means coupled between said scan power means and the second transfer gear for effecting variations in the angle of the scanning beam while allowing rotation of the frame and transducer about said vertical axis.

6. The system of claim 4 wherein said housing includes a liquid substance surrounding said transducer and providing a medium for conveying sound waves between said transducer and said housing during generation and detection of said scanning beam and for damping oscillations of suspended transducer.

7. The system of claim 4 further including electrical cable means connecting electronic control means to said transducer without interference with the susupension or rotation of said transducer about said vertical axis.

8. The system of claim 5 wherein said gear means includes
a hollow stem member rigidly attached to said support means and journaled for rotation about said vertical axis;
a first rack member slidably mounted within said stem member for up and down movement relative thereto, said first rack member being in mesh with said second transfer gear for imparting rotation to said second transfer gear in response to sliding movement of said first rack member;
a second rack member slidably mounted within said stem member rotatably connected to said first rack member and operatively connected to said scan power means for imparting up and down movement to said first and second rack members, said first rack member rotatable relative to said second rack member to permit rotation of the first rack member simultaneously with up and down movement of the rack members.

9. The system of claim 2 wherein said ring gear includes a segment of a 360 degree ring gear having an arc of at least ninety degrees and wherein said ring gear is connected to said transducer to direct the scanning beam thereof downward at an angle of forty-five degrees from horizontal when said pinion gear is positioned midway between the ends of the ring gear segment.

10. The system of claim 9 wherein the gear ratio of said second transfer gear to said pinion gear is substantially the same as the gear ratio of said ring gear to said pinion gear.

11. The system of claim 1 further including
an elevator well adapted for mounting within the hull of a ship adjacent the keel and open at the lower end;
a water-tight housing enclosing said transducer and transducer drive means mounted within said elevator well; and
a lift mechanism connected to said housing for raising and lowering the housing within the elevator well to advance said transducer to a scanning position below the keel of a ship and to retract the housing to a rest position within said well for protection of said transducer when not in use.

12. The system of claim 11 further including guide members attached to said housing and abutting the inner walls of the elevator well to prevent lateral movement of the housing within the well and permit free flow of water past the housing as the housing is raised and lowered.

13. The system of claim 11 wherein said lift mechanism includes
a tie rod connected at one end to said housing and at the other end to the piston rod of a double acting hydraulic cylinder, said tie rod raising and lowering said housing relative to said well upon advance and retraction of said piston rod; and
a hydraulic control circuit operatively connected to said cylinder for advancing and retracting said piston rod to raise and lower the housing, said tie rod moving said housing outside the elevator well a distance sufficient to give the transducer a clear field for scanning in a horizontal plane 360 degrees around the ship.

14. A system for scanning and detecting schools of fish in a body of water comprising a marine vessel;
a sonar system mounted in said vessel, said sonar system comprising (1) a frame, (2) an acoustic transducer capable of generating a sonar scanning beam and detecting sound waves reflected from objects such as fish, said transducer pendulously suspended from said frame so that said scanning beam is substantially stabilized against the roll and pitch of said vessel, the face of the oscillatory driving element of said transducer mounted for rotation about an axis perpendicular to the vertical axis of said frame, (3) transducer drive means for varying the angle of said transducer and scanning beam with respect to said vertical axis independently of the suspension of said transducer from said frame, (4) scan drive means for rotating the frame and transducer about said vertical axis, (5) a water tight housing enclosing said frame and transducer, and (6) a high dielectric constant liquid within said housing surrounding said transducer; and
means for advancing said transducer to a scanning position below the keel of said vessel and for retracting it to a rest position when not in use.

References Cited

UNITED STATES PATENTS

| | | | |
|---|---|---|---|
| 2,407,697 | 9/1946 | Williams | 181—.5 |
| 2,759,783 | 8/1956 | Ross | 340—3X |

RICHARD A. FARLEY, Primary Examiner

U.S. Cl. X.R.

181—.5; 340—8

UNITED STATES PATENT AND TRADEMARK OFFICE
CERTIFICATE OF CORRECTION

PATENT NO. : B1 3,553,638
DATED : January 11, 1983
INVENTOR(S) : Kenneth L. Sublett It is certified that error appears in the above—identified patent and that said Letters Patent is hereby corrected as shown below:

In claim 1, column 1, lines 26-34 are deleted.

Signed and Sealed this

Thirty-first Day of July 1984

[SEAL]

Attest:

GERALD J. MOSSINGHOFF

Attesting Officer  Commissioner of Patents and Trademarks

REEXAMINATION CERTIFICATE (39th)

United States Patent [19]

Sublett

[11] B1 3,553,638

[45] Certificate Issued Jan. 11, 1983

[54] SONAR SCANNING MECHANISM

[75] Inventor: Kenneth L. Sublett, Seattle, Wash.,

[73] Assignee: Western Marine Electronics Company, Seattle, Wash.

Reexamination Request
No. 90/000,025 Jul. 13, 1981

Reexamination Certificate for:
Patent No.: 3,553,638
Issued: Jan. 5, 1971
Appl. No.: 841,188
Filed: Jun. 19, 1969

[51] Int. Cl.³ ....... G01S 7/52; G01S 15/96; H04R 1/44
[52] U.S. Cl. .................... 367/12; 367/104; 367/173
[58] Field of Search ........................... 367/12, 104, 173

[56] References Cited

U.S. PATENT DOCUMENTS

| | | |
|---|---|---|
| 52,364 | 1/1866 | Mayhew. |
| 831,143 | 9/1906 | Conrader. |
| 1,552,833 | 9/1925 | Smith. |
| 1,560,468 | 11/1925 | Dodson. |
| 1,566,586 | 12/1925 | Dodson. |
| 1,583,262 | 5/1926 | Smith. |
| 1,614,381 | 1/1927 | Moreland. |
| 1,633,843 | 6/1927 | Bostic. |
| 1,730,158 | 10/1929 | Merrick. |
| 1,910,631 | 5/1933 | Osborne. |
| 2,407,697 | 9/1946 | Williams ...................... 367/173 X |
| 2,832,944 | 4/1958 | Kessler .............................. 367/173 |
| 3,103,391 | 9/1963 | Leathers. |

FOREIGN PATENT DOCUMENTS 897739   5/1962   United Kingdom.

*Primary Examiner*—Richard A. Farley

[57] ABSTRACT

A marine sonar system is disclosed employing a support mechanism for an acoustic tranducer capable of stabilizing the transducer from the pitch and roll motion of a ship. The transducer is freely suspended from a frame. A drive mechanism for varying the angle of the tranducer includes two ring gears meshed with pinion gears journaled in the frame. The ring gears are free to rotate about the pinion gears to align with the gravity vector. Additonally, rotation of the pinion gears rotates the transducer without disturbing its alignment with the gravity vector. The tranducer can be aimed to varying water depths by rotation of the pinion gears. The pinion gears are driven by an intermediate gear mechanism meshed with vertical rack gears. The rack gears are split into halves so that one-half can remain in mesh with a drive motor while the entire frame on which the transducer is mounted is rotated to aim the transducer at various angles. The sonar system further includes means for raising and lowering the transducer relative to the hull of the ship between scanning and rest position.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5–10 and 14 is confirmed.

Claims 11 and 13, having been finally determined to be unpatentable, are cancelled.

Claims 1–4 and 12 are determined to be patentable as amended:

1. A sonar system for installation in a marine vessel which comprises:
   an acoustic transducer for generating a sonar scanning beam and for detecting sound waves reflected from objects;
   an acoustic transducer for generating a sonar scanning beam and for detecting sound waves reflected from objects;
   an acoustic transducer for generating a sonar scanning beam and for detecting sound waves reflected from objects;
   an acoustic transducer for generating a sonar scanning beam and for detecting sound waves reflected from objects;
   support means;
   *pendulum means having a longitudinal axis;*
   *suspension means for pendulously suspending said pendulum means from said support means for gravity-determined orientation of the pendulum means so that its longitudinal axis is normally a substantially vertical axis;*
   mounting means journaled to said [support] *pendulum* means and mounting said transducer to said [support] *pendulum* means such that said [support means and] transducer [are] *is* independently pivotable *relative to said pendulum means* about a transverse axis *spaced below said suspension means and perpendicular to said longitudinal axis;*
   vertical scan drive means operably coupled to said transducer to rotate said transducer about [a] *said* transverse axis for vertical scanning without [affecting the independent pivotability of said transducer and support means] *moving the longitudinal axis of the pendulum from a substantially vertical position;* [and]
   horizontal scan drive means operably [coupled to] *interconnected with* said transducer to rotate said transducer about [a vertical] *said longitudinal* axis [perpendicular to said transverse axis] for horizontal scanning without [affecting the independent pivotability of said transducer and support means] *moving the longitudinal axis of the pendulum from a substantially vertical position; and*
   *a watertight housing independent of operation of said horizontal scan drive means and enclosing said transducer, support means, pendulum means, and suspension means.*

2. The system of claim 1 wherein said [horizontal] *vertical* scan drive means includes:
   a pinion gear journaled for rotation in said support means;
   a ring gear rigidly connected to said transducer and in mesh with said pinion gear for [effecting] *affecting* variations in the angle of said transducer and sonar scanning beam in response to rotation of said pinion gear; and
   pinion drive means to rotate said pinion gear.

3. The system of claim 2 wherein said support means includes a frame, *and said pendulum means includes* a support arm pivotally connected at one end to said frame on an axis coincident with the axis of rotation of said pinion gear and pivotally connected at the other end to said transducer on an axis coincident with the axis of rotation of said ring gear, the teeth of the ring and pinion gears meshed to allow rotation of the pinion gear relative to the ring gear.

4. The system of claim 3, further including [a housing enclosing the transducer frame;] a platform rigidly attached to said housing, said frame being rotatably supported from said platform for rotation about said vertical axis to permit 360° scanning of said transducer.

12. *A sonar system for installation in a marine vessel which comprises:*
   *an acoustic transducer for generating a sonar scanning beam and for detecting sound waves reflected from objects;*
   *support means;*
   *mounting means journaled to said support means and mounting said transducer to said support means such that said support means and transducer are independently pivotable about a transverse axis;*
   *vertical scan drive means operably coupled to said transducer to rotate said transducer about a transverse axis for vertical scanning without affecting the independent pivotability of said transducer and support means;*
   *horizontal scan drive means operably coupled to said transducer to rotate said transducer about a vertical axis perpendicular to said transverse axis for horizontal scanning without affecting the independent pivotability of said transducer and support means;*
   *an elevator well adapted for mounting within the hull of a ship adjacent the keel and open at the lower end;*
   *a watertight housing enclosing said transducer and transducer drive means mounted within said elevator well;*
   *a lift mechanism connected to said housing for raising and lowering the housing within the elevator well to advance said transducer to a scanning position below the keel of a ship and to retract the housing to a rest position within said well for protection of said transducer when not in use; and*
   [The system of claim 11 further including] guide members attached to said housing and abutting the inner walls of the elevator well to prevent lateral movement of the housing within the well and permit free flow of water past the housing as the housing is raised and lowered.

New claims 15–17 are added and determined to be patentable.

15. The sonar system of claim 1 in which said support means is arranged to turn within said housing and is coupled to said horizontal scan drive means whereby, when said support means is turned, the suspension means, pendulum means, and transducer turn responsively for horizontal scanning.

16. The sonar system of claim 1 in which said pendulum means is pendulously suspended by said suspension means to freely swing only about a pendulous axis which is always parallel to said transverse axis.

17. The sonar system of claim 1 wherein said vertical scan drive means includes a motor mounted above said support means and a mechanical linkage coupling rotational movement from said motor to said transducer across the pendulous suspension of said pendulum means.

* * * * *